US005652567A

United States Patent [19]
Traxler

[11] Patent Number: 5,652,567
[45] Date of Patent: Jul. 29, 1997

[54] ADJUSTABLE ZONE SECURITY SYSTEM

[75] Inventor: Norbert Traxler, Prior Lake, Minn.

[73] Assignee: C.O.P. Corp., Mankato, Minn.

[21] Appl. No.: 517,904

[22] Filed: Aug. 22, 1995

[51] Int. Cl.$^6$ ................................................ G08B 13/18
[52] U.S. Cl. .................... 340/552; 340/567; 340/541; 340/565; 340/566; 250/347
[58] Field of Search .................... 340/541, 551, 340/552, 553, 554, 555, 556, 522, 565, 566, 567, 693, 521; 250/347, 353; 342/28

[56] References Cited

U.S. PATENT DOCUMENTS

| | | | |
|---|---|---|---|
| 3,707,708 | 12/1972 | Dan | 340/521 |
| 3,846,776 | 11/1974 | Galvin et al. | 340/554 |
| 3,967,283 | 6/1976 | Clark et al. | 343/7.7 |
| 4,271,359 | 6/1981 | Herwig et al. | 250/347 |
| 4,305,021 | 12/1981 | Schreiden | 315/159 |
| 4,602,357 | 7/1986 | Yang et al. | 367/93 |
| 4,638,294 | 1/1987 | Sakurai | 340/63 |
| 4,746,906 | 5/1988 | Lederer | 340/552 |
| 4,851,746 | 7/1989 | Milke | 318/467 |
| 4,951,045 | 8/1990 | Knapp et al. | 340/944 |
| 4,960,995 | 10/1990 | Neumann et al. | 250/353 |
| 4,987,402 | 1/1991 | Nykerk | 340/426 |
| 5,015,994 | 5/1991 | Hoberman | 340/567 |
| 5,319,350 | 6/1994 | DeMarco et al. | 340/435 |
| 5,361,071 | 11/1994 | van Zon | 342/42 |
| 5,381,128 | 1/1995 | Kaplan | 340/426 |
| 5,381,323 | 1/1995 | Osteen et al. | 340/567 |
| 5,412,371 | 5/1995 | Kaplan | 340/426 |
| 5,440,292 | 8/1995 | Bedrosian | 340/565 |
| 5,463,595 | 10/1995 | Rodhall et al. | 340/522 |

*Primary Examiner*—Jeffery Hofsass
*Assistant Examiner*—Benjamin C. Lee
*Attorney, Agent, or Firm*—Haugen and Nikolai, P.A.

[57] ABSTRACT

Security systems which include an adjustable structure and a motion detector which detects changes in electromagnetic energy from within a zone of protection are described. The structure has a base for mounting the motion detector and wall members which extend away from the base and to form walls around the detector. The wall members are adjusted to positions between the plane of the base and planes perpendicular to the base to alter the shape of the zone of protection and conform it to the area or object of interest. The motion detector is electrically connected to a control unit and alarm module which includes a shock sensor and a current sensor. The motion detector and the control unit and alarm module are connected to a power supply and operated by remote control.

20 Claims, 4 Drawing Sheets

ADJUSTABLE ZONE SECURITY SYSTEM

BACKGROUND OF THE INVENTION

I. Field of the Invention

The invention relates generally to security systems and, more particularly, to a system based on detecting disturbance in electromagnetic energy field properties in a predetermined area of interest to create a zone of protection.

II. Discussion of the Related Art

Today it is common for a person or a family of ordinary means to own a home and several cars, and also possibly a boat or a motorcycle. These owners typically store or stow personal property items in their homes and vehicles, including watercraft. The items may include relatively expensive items, such as televisions, video recorders, stereos, cellular telephones, fish detectors, or fishing gear, and items of personal value or interest, such as jewelry or hand-picked fishing lures. Unfortunately, not everyone shares the high moral standards or motivation which require one to purchase or otherwise legally obtain such vehicles and personal items. Instead, some people choose to surreptitiously acquire such items from others. Rightful owners, of course, desire to protect themselves and their property from incidents of malfeasance involving others helping themselves to their belongings; and, to this end, motion detectors have been developed to keep intruders at bay.

Motion detectors are traditionally either mechanical jiggle devices or electronic devices which detect changes in electromagnetic energy fields. The electronic devices may be either passive devices, such as passive infrared detectors, or active devices which radiate and detect electromagnetic energy, such as radio frequency waves in the microwave range.

Electronic motion detectors are used in a variety of applications, including automatic lights and doors. U.S. Pat. No. 4,305,021, issued to Schreiden, describes a switch for automatically turning on a light wherein the switch includes a light sensor and a microwave motion detector. The light is energized if motion is detected and the ambient light is low enough to warrant it. U.S. Pat. No. 4,851,746, issued to Milke, describes a sensing apparatus for an automatic door including a plurality of infrared emitters and corresponding detectors. Reflected energy is detected and control logic operates the door. The infrared emitter LED's are situated at an angle to create detection zones such that objects in the detection zones cause the door to open.

In a security system for protecting an occupant of a vehicle, such as a police officer, as described in U.S. Pat. No. 5,319,350, issued to DeMarco et al., a plurality of motion detectors are disposed on the vehicle to monitor approximately 360° around the vehicle. The occupant of the vehicle is warned by an alarm which provides audible and visible indications that motion has been detected in the surrounding area. The zone in which motion is detected is an important aspect of the system.

U.S. Pat. No. 4,951,045, issued to Knapp et al., describes a sign which includes visual and, optionally, audible warning systems which are activated by a motion detector which detects the presence of an individual approaching the sign. An electronic sensitivity control limits the size of the motion detection area by adjusting the sensitivity of the motion detector.

In another system, as described in U.S. Pat. No. 4,987,402, issued to Nykerk, an alarm system detects motion near a protected object, such as an automobile, and issues audible warnings. The motion detector includes a radio frequency (RF) oscillator having an RF transistor biased for oscillation. A variable resister is placed in the emitter of the RF transistor for adjusting the size of the RF signal and the motion detection area. The shape of the RF signal is not otherwise adjustable.

U.S. Pat. No. 4,638,294, issued to Sakurai, describes an electromagnetic wave oscillator installed in the passenger compartment of an automobile to generate a wave with a frequency defined by the size of the compartment. The compartment resonates as a cavity resonator with all the doors and windows closed. A detecting circuit senses changes in the electromagnetic wave if a door or window is opened.

U.S. Pat. No. 3,967,283, issued to Clark et al., describes a system wherein a signal is reflected to detect intruders in a large area. The reflectors are not adjustable to shape the outgoing or incoming signals and the zone of protection. Thus, the system is not well suited to protecting an object, such as an automobile or boat, wherein only the area including and very near the object is of interest.

In many situations, such as in protecting a boat and its contents, the area of interest is not enclosed. A different manner of shaping or conforming the signal to the area or object of interest is needed. The invention contemplates an electronic motion detection system which provides an adjustable zone of protection particularly suitable for watercraft or automobiles.

OBJECTS

It is accordingly a principle object of the present invention to provide an improved security system.

Another object of the invention is to provide an improved security system which includes a motion detector for detecting changes in electromagnetic energy to protect a vehicle and its contents from intruders.

Yet another object of the invention is to provide a security system for detecting changes in electromagnetic energy in a zone of protection adjustable in three dimensions.

A further object of the invention is to provide a motion detecting system wherein the zone of protection is adjustable to conform the zone of protection to the objects of interest, such as boats and automobiles.

Other objects, features, and advantages of the present invention will become apparent to those skilled in the art through familiarity with the summary of the invention, detailed description, claims, and drawings herein.

SUMMARY OF THE INVENTION

The foregoing objects of the present invention are among those attained by providing a security system including, in the preferred embodiment, an adjustable zone defining structure signal transmitter and motion detector or field disturbance sensor which form an adjustable zone of protection which includes an area or object of interest, such as the area in and near a boat. The adjustable structure has deflector or wall members which are positioned alongside the motion detector to affect or direct electromagnetic energy and form a zone of protection in which changes in electromagnetic energy are detected by a field disturbance sensor or the motion detector. An audible alarm is activated by the motion detector upon registration of a security breach in this zone. The motion detector may be either a passive or active electronic detector for receiving electromagnetic energy from within the zone of protection.

In one embodiment of the invention, the adjustable structure has wall members attached along each edge of a rectangular, centrally located, planar base. The wall members act as separate members in that each is moveable or bendable from out of plane of the base to any angle, including an upright or perpendicular position in relation to the base. In the upright position, the wall members and base form an open ended rectangular box. The motion detector is mounted to the base of the adjustable structure such that the wall members wall the detector. The electromagnetic energy radiated from and/or received by the motion detector or field disturbance sensor is directed by the wall members such that the shape of the zone of protection varies depending upon the angle between the wall members and the base. The zone of protection is substantially in front of the open end of the adjustable structure which is made from a material which directs electromagnetic energy and maintains its shape after being bent, such as metal, possibly aluminum.

The motion detector is electrically connected to a control unit equipped with an audible alarm or siren. The control unit includes a shock sensor which is a mechanical motion detector whose sensitivity is adjustable. The control unit and the motion detector are connected to a power supply which is provided separately or in the protected vehicle. The control unit also includes a current sensor which detects a change in current from the power supply. Of course, the current sensor may be disabled or disconnected for convenience if other devices, such as pumps which run intermittently, are connected to the same power supply.

In an example use of this embodiment, the adjustable structure is secured to the control panel or other convenient location of a pleasure boat such that the open end is directed into the interior area of the pleasure boat. The motion detector is mounted on the base of the adjustable structure and the wall members adjusted alongside to create the desired zone of protection. The three dimensional shape of the zone of protection is determined by the position of the wall members relative to the base, normally they are positioned between the plane of the base and planes perpendicular to conform the base to the zone to the shape of the boat. The control unit and alarm or siren is attached to the boat and electrically connected to the power supply and the motion detector which is also connected to the power supply.

In operation, the motion detector is activated by a remote control unit. The zone of protection and the sensitivity of the shock sensor are adjusted to conform to the shape of the protected area. The alarm or siren is activated by the motion detector if a security breach is detected in the zone of protection such as by an invasive hand in the protected area. The siren remains on for a predetermined time and may intermittently turn on and off until the remote control is operated to deactivate the alarm system.

In the embodiment described herein, the motion detector radiates a microwave signal normally in the range 1.0 to 3.0 Gigahertz (Ghz). The wall members shape the signal and the field disturbance sensor of the motion detector responds to motion in the zone of protection. Of course, a different type of motion detector, based on other electrical or electromagnetic properties of the system or operating at a different frequency, may be used with the present invention. Also, any control unit and/or alarm which is compatible with the chosen motion detector may be used, including audible alarms, visual alarms, and silent alarms or any combination of the foregoing.

DETAILED DESCRIPTION

Figure 1:
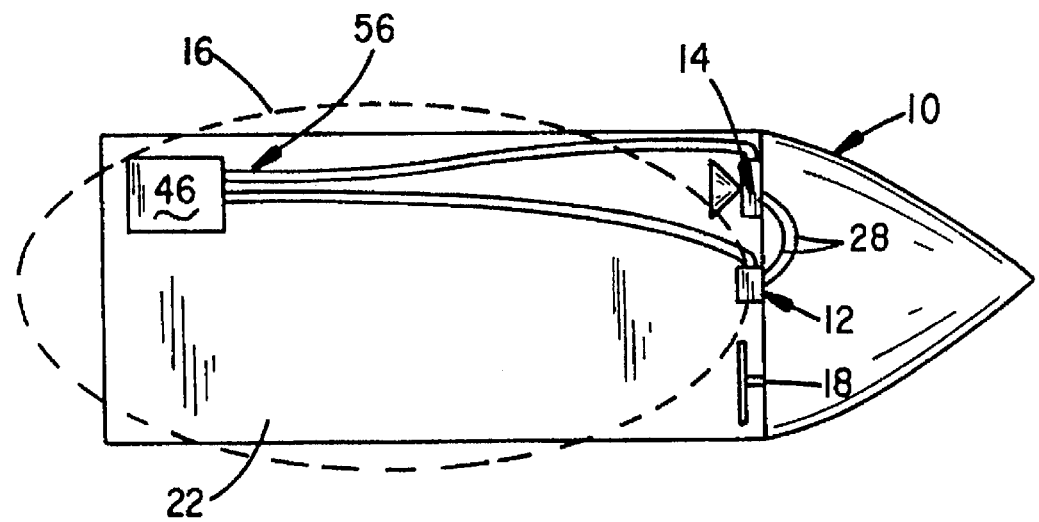
FIG. 1 is a diagrammatic top plan view of a boat employing the security system of the present invention wherein the motion detector is attached to the control panel of the boat.
Figure 2:
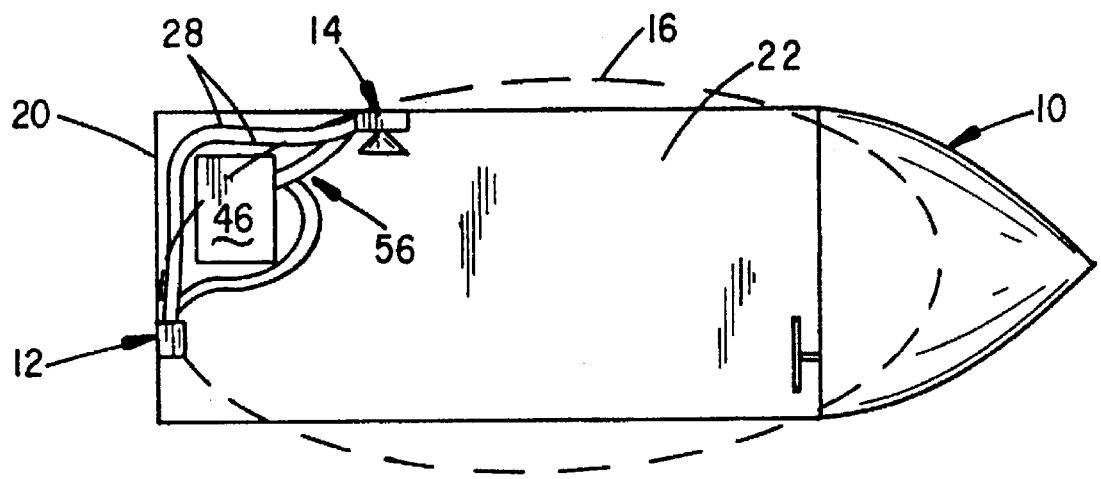
FIG. 2 is similar to FIG. 1 with the motion detector attached to the rear of the boat.

The security system of the present invention may be configured or built to protect any area or vehicle of interest, including a home, automobile, boat, motorcycle, or aircraft. As shown in FIGS. 1 and 2, the security system is incorporated to protect a boat 10, including its contents. The security system includes a field disturbance or motion detecting system, indicated generally by the numeral 12, which generates a zone of electromagnetic energy and registers disturbances in that zone. A three dimensional volume or zone of protection is shown in dashed lines and indicated by the numeral 16. The motion detecting system 12 may be attached to the control panel 18, FIG. 1, or the rear 20, FIG. 2, or in any desired position that enables creation of the desired zone of protection 16 in the passenger compartment 22 of the boat 10. If movement is detected in the zone of protection 16, the motion detecting system 12 registers a security breach and activates a control unit and alarm module 14.

Figure 3:
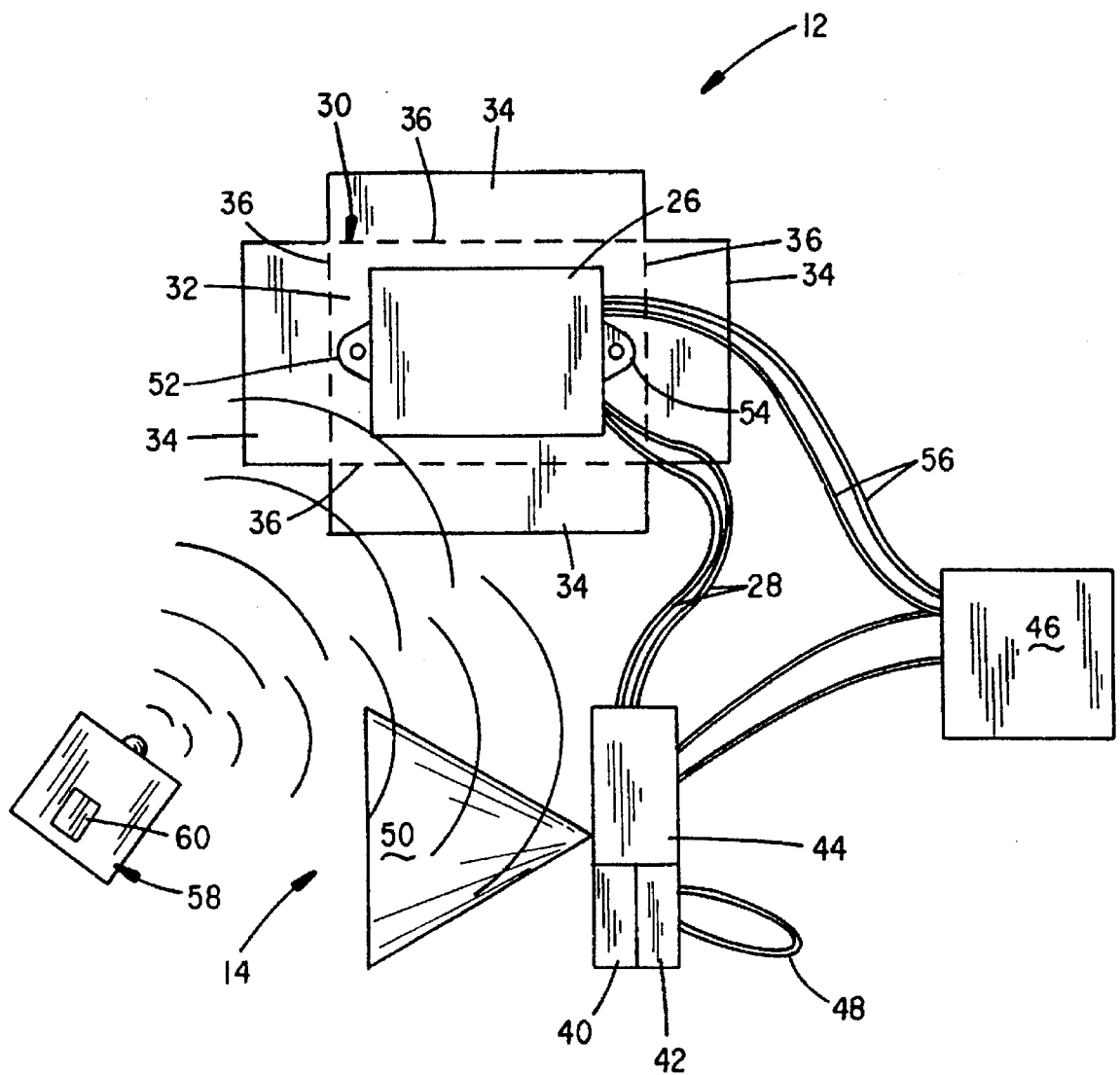
FIG. 3 is a schematic diagram of the security system showing the motion detector situated in the adjustable structure and electrically connected to a power supply and the control unit with a siren which is also electrically connected to the power supply.

As shown in FIG. 3, the motion detecting system 12 includes an adjustable structure 30 having a flat, rectangular base 32 mounting a motion detector scanner 26 which is electrically connected by wires 28 to the control unit and alarm module 14. The scanner 26 is an active electronic motion detector which radiates and receives normally in the 1 to 3 Gigahertz (Ghz) range microwave signals. The adjustable structure 30 has wall members 34 connected to the base 32 along the edges thereof and bendable along dashed lines 36 from the plane of the base 32 to form walls on each side of the scanner 26. The adjustable structure 30 may be made from any material, which directs the electromagnetic energy radiated by and received by the scanner 26 and maintains its shape after bending. Metals, such as aluminum are preferred. The wall members 34 are designed to be bent to angles between the plane of the base 32 and a line perpendicular to the plane of the base 32 to define or shape the zone of protection 16.

The control unit and alarm module 14 includes an electronic control unit 44 which activates a siren 50 if a security breach is registered. A shock sensor 40 and current sensor 42 are provided in the control unit and alarm module 14. The shock sensor 40 may be a conventional mechanical vibration sensor for detecting movement of the control unit and alarm module 14. The sensitivity of the shock sensor 40 may be adjusted to avoid registering security breaches for light shocks if the boat 10 is in the water. A current sensor 42 is provided to detect changes in the current received from a power supply 46, such as a 12 Volt battery. The current sensor 42 includes a wire 48 which may be opened to disconnect the sensor 42. This is useful if the power supply 46 is used to power other devices which intermittently turn on and off, such as pumps. The electronic control unit 44 monitors the motion detector scanner 26, the shock sensor 40 and the current sensor 42 and activates the siren 50 if a security breach is registered.

As is also shown in FIGS. 1–3, to mount the embodiment described herein on the boat 10, the adjustable structure 30 is secured under the scanner 26 and both may be attached to either the control panel 18 or the rear 20 of the boat 10. The scanner 26 includes screw mounts 52 and 54 through which screws are placed to secure the scanner 26 and adjustable structure 30 in place. The control unit and alarm module 14 is similarly secured to the boat 10 and electrically connected to the scanner 26 by the wires 28. The scanner 26 and the control unit and alarm module 14 are connected by wires, indicated generally by the numeral 56, to the power supply 46. A radio frequency (RF) remote control transmitter 58 operated by push button 60 is provided for activating and deactivating the security system.

Figure 4:
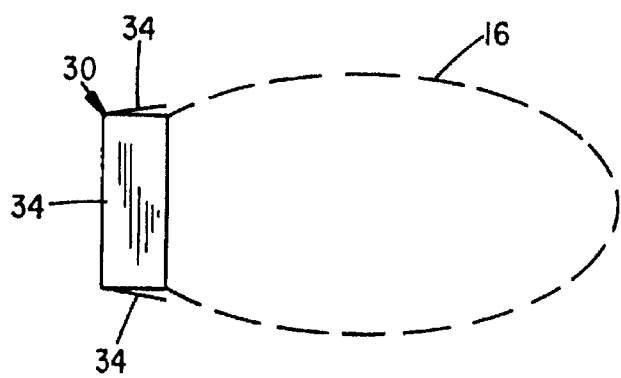
FIG. 4 is a side view of the adjustable structure having the wall members substantially perpendicular to the base and showing the zone of protection in dashed lines.
Figure 5:
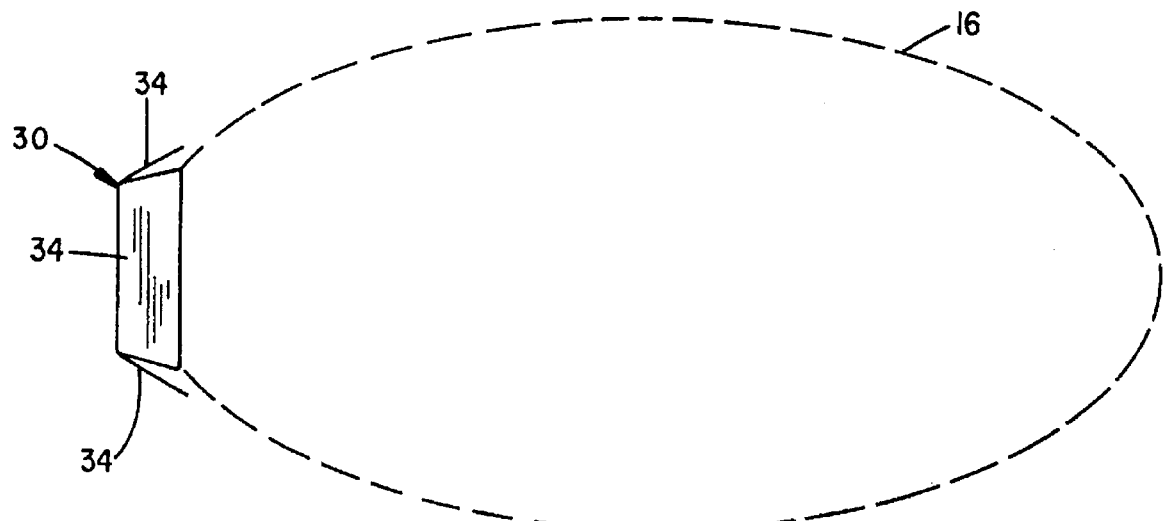
FIG. 5 is a side view of the adjustable structure having the wall members about midway between the perpendicular position and a co-planar position in relation to the base, and showing the resultant zone of protection in dashed lines.
Figure 6:
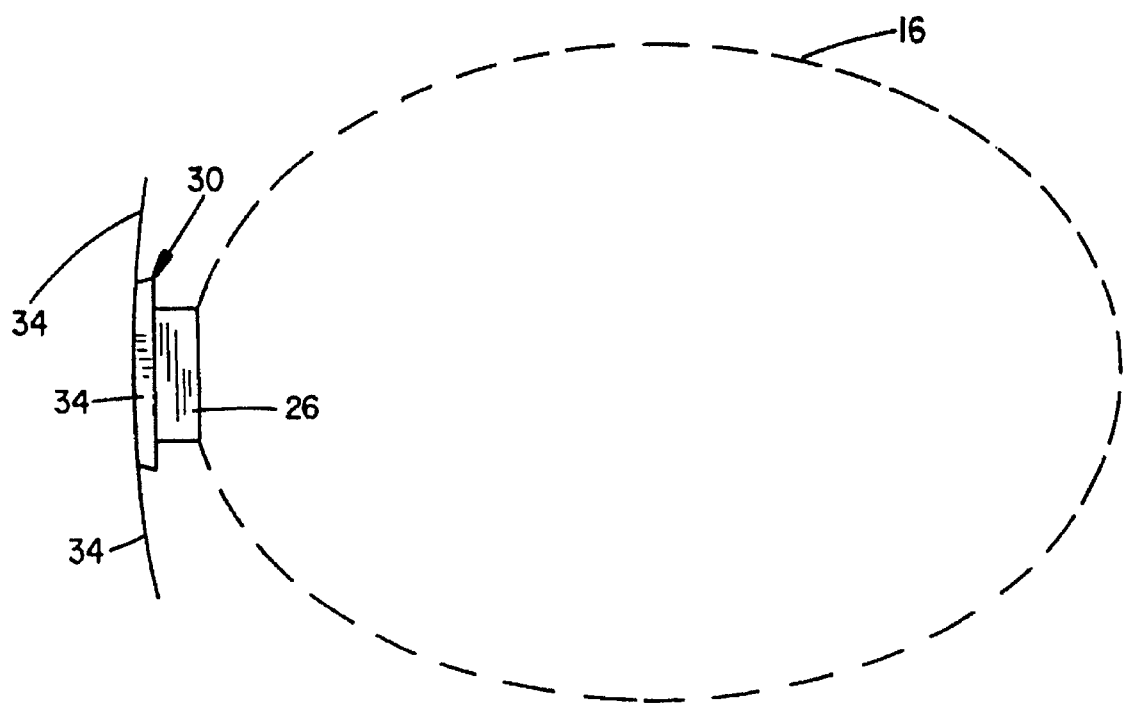
FIG. 6 is a side view of the adjustable structure showing the wall members in an open position and showing the resultant zone of protection in dashed lines.

In accordance with one aspect of the invention and as shown in FIGS. 4–6, the shape of the zone of protection 16 may be conventually altered by moving the wall members 34 from the plane of the base 32 between the perpendicular position, FIG. 4, and the coplanar or planar position, FIG. 6. In the perpendicular position, the wall members 34 shape the zone of protection 16 to minimized in size as shown in FIG. 4. Bending the wall members 34 to a position between the perpendicular and planar positions, FIG. 5, creates a zone of protection 16 which is wider and deeper and has the greatest length. Moving the wall members 34 to a position substantially parallel with the base 32, FIG. 6, exposes the scanner 26 and creates a zone of protection 16 having the greatest width and depth, and a length which is between the lengths of the zones 16 created by the perpendicular wall members 34, FIG. 4, and the wall members 34 in substantially the midway position, FIG. 5. Thus, the shape of the zone of protection 16 may be altered to conform to the area desired to be protected.

In the example, if the boat 10 is a conventional pleasure boat, perhaps from 12 to 21 feet long, it has been found that employing wall members 34 about 1⅝ inches (4.13 cm) wide, or wherein the plurality of wall members have a width extending away from the plane of radiation of about one quarter wave length of the radiated electromagnetic energy, and are bent from the base 32 to an angle between 30° to 45° to create the desired zone of protection 16. Of course, in other applications for protecting other watercraft or vehicles or homes the optimum width of the wall members 34 and range of deflection of the wall members 34 will vary.

This invention has been described herein in considerable detail in order to comply with the patent statutes and to provide those skilled in the art with the information needed to apply novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A security system, comprising:

a base;

a motion detector means for detecting the breach of security in a zone of protection mounted on said base;

said base having an extension thereof and forming with said base an adjustable electromagnetic energy directing structure that with said base defines said zone of protection from which electromagnetic energy of interest is received at least in part directly by said motion detector means, wherein at least a portion of said adjustable structure is angularly adjustable to the shape of said zone of protection;

wherein said motion detector means radiates electromagnetic energy and the adjustable electromagnetic energy directing structure is selectively adjusted to direct the pattern of electromagnetic energy radiated and the electromagnetic energy received by said motion detector means;

means to register a security breach if movement is detected in said zone of protection; and wherein said base and motion detector means are directly exposed to radiation in said zone of protection.

2. The security system as in claim 1 further comprising alarm means including an alarm wherein said alarm means is electrically connected to said motion detector and said alarm is activated by the security breach.

3. The security system as in claim 2 further comprising a shock sensor.

4. The security system as in claim 3 further comprising a current sensor for detecting a current fluctuation from a power supply connected to the security system.

5. The apparatus of claim 1 wherein said base extensions comprise at least one directionally adjustable wall member.

6. The security system as in claim 5 wherein at least one of said plurality of wall members is deformed to an angle within the range from 30° to 45° from said base to form said zone of protection.

7. The apparatus of claim 5 wherein said adjustable electromagnetic energy directing structure comprises a plurality of directionally adjustable wall members attached to and extending away from said base, said wall members being individually angularly adjustable with respect to said base.

8. The apparatus of claim 7 wherein said wall members are metallic sheet stock.

9. The security system as in claim 7 wherein said plurality of wall members are moved to an angle within the range from 30° to 45° from said base to form said zone of protection.

10. The security system as in claim 1 further comprising alarm means including an alarm wherein said alarm means is electrically connected to said motion detector and said alarm is activated by the security breach.

11. The security system as in claim 10 further comprising a shock sensor.

12. The security system as in claim 11 further comprising a current sensor for detecting a current fluctuation from a power supply connected to the security system.

13. The security system as in claim 12 wherein said adjustable structure is formed from a single piece of material.

14. A security system comprising:

a substantially planar open base structure;

a motion detector means for detecting a breach of security in a zone of protection mounted on said open base;

an adjustable structure extending from said base and including a plurality of directionally adjustable wall members attached to and extending away from said base wherein said wall members are angularly displaceable in relation to said base;

wherein said motion detector means is situated between said plurality of wall members such that electromagnetic energy received by said motion detector means comes from a zone of protection as altered by adjusting said wall members, said motion detector means being directly exposed to said zone of protection and registering a security breach if movement is detected in said zone of protection;

wherein said motion detector means radiates electromagnetic energy and said plurality of wall members direct the radiated and the received electromagnetic energy to and from said motion detector means; and alarm means including an alarm wherein said alarm means is electrically connected to said motion detector means and said alarm is activated by the security breach.

15. The security system as in claim 14 wherein said adjustable structure is a single piece of material.

16. The security system as in claim 14 further comprising a shock sensor connected to said alarm means to activate said alarm upon registration of a shock sensor security breach.

17. The security system as in claim 14 further comprising a current sensor connected to said alarm means to activate said alarm if a current fluctuation is sensed from a power supply connected to the security system.

18. The security system as in claim 14 wherein said plurality of wall members have a width which is one quarter wavelength of the radiated electromagnetic energy from the plane of radiation.

19. The security system as in claim 14 wherein at least one of said plurality of wall members is deformed to an angle within the range from 30° to 45° from said base to form said zone of protection.

20. The security system as in claim 14 wherein said plurality of wall members are moved to an angle within the range from 30° to 45° from said base to form said zone of protection.

* * * * *